US005103131A

United States Patent [19]

Sekine

[11] Patent Number: 5,103,131

[45] Date of Patent: Apr. 7, 1992

[54] BRUSH HOLDER

[75] Inventor: Shuji Sekine, Yokohama, Japan

[73] Assignee: Jidosha Denki Kogyo K.K., Kanagawa, Japan

[21] Appl. No.: 595,133

[22] Filed: Oct. 10, 1990

[30] Foreign Application Priority Data

Oct. 11, 1989 [JP] Japan ............ 1-118866[U]

[51] Int. Cl.[5] ............ H02K 13/00

[52] U.S. Cl. ............ 310/239; 310/242

[58] Field of Search ............ 310/239, 242, 244, 245, 310/246, 247, 248, 249, 232, 51, 238, 233

[56] References Cited

U.S. PATENT DOCUMENTS 4,085,346 4/1978 Yoshida ............ 310/245
4,088,912 5/1978 Yoshida ............ 310/244
4,157,483 6/1979 Frimley ............ 310/242
4,431,933 2/1984 Mabuch ............ 310/239

FOREIGN PATENT DOCUMENTS 0148308 11/1977 Japan ............ 310/239

*Primary Examiner*—R. Skudy
*Attorney, Agent, or Firm*—Sughrue, Mion, Zinn, Macpeak & Seas

[57] ABSTRACT

A brush holder comprises a holding part provided with a contact part in contact with a brush and three resilient pieces pressing the brush toward the contact part. It is possible to support the brush securely in the holding part and possible to prevent the brush from the disconnection and the occurrence of objectable noise and vibration of the motor.

2 Claims, 2 Drawing Sheets

BRUSH HOLDER

BACKGROUND OF THE INVENTION

1. Field of the Invention

This invention relates to a brush holder used for contacting a brush with a commutator and supplying a power to an armature, for example, in an electric motor.

2. Description of the Prior Art

As a conventional brush holder, there has been used a brush holder as shown in FIG. 3 and FIG. 4 for example.

A brush holder 104 shown in the figures is made of thin metallic plate and supports a brush 103 in a holding part 105 thereof so as to contact the brush 103 with a commutator 102 provided to an armature 101 of an electric motor shown in FIG. 3.

The brush holder 104 is provided with an opening 105*a* cut out rectangularly in a plane part 104*a* thereof for inserting a projection 103*b* sticking out from a contacting part 103*a* of the brush 103, and is provided with two holder piece 105*b*'s protruding bendingly toward the center portion from side edges 104*b* and 104*c* of the plane part 104*a* in symmetry. And the opening 105*a* and the two holder piece 105*b*'s form the holding part 105.

As shown in FIG. 4, the projection 103*b* of the brush 103 is inserted into the opening 105*a* of the holding part 105 from the lower side in the figure and the contacting part 103*a* of the brush 103 is contacted with the plane part 104*a* of the brush holder 104. And the brush holder 104 is so designed as to support the brush 103 in the holding part 105 by pinching the projection 103*b* of the brush 103 from both sides with the holder piece 105*b*'s.

The brush holder 104 is fixed to a holder base (not shown) at the opposite end of the holding part 105, and energizes the brush 103 so as to contact the contacting part 103*b* with the commutator 102 by elasticity thereof.

Supplying an electric current to the armature 101 through the commutator 102 from a wire connected to the brush 103 or the brush holder 104, the armature 101 rotates, for example, in the direction of the arrow shown in FIG. 3.

However, in the aforementioned conventional brush holder 104, the brush 103 is holded in the holding part 105 of the brush holder 104 by pinching the projection 103*b* between the holder piece 105*b*'s, accordingly the brush 103 is so supported as not to move in the vertical direction in FIG. 3, that is in the direction prependicularly intersecting the rotational direction of the armature 101, but may move side to side in FIG. 3, that is in the direction corresponding to the rotational direction of the armature 101. Therefore, there is a problem in quality of the motor since the projection 103*b* of the brush 103 moves in the opening 105*a* of the brush holder 104 according to the rotation of the aramture 101, and objectionable noise and vibration appear owing to the hit between the brush 103 and the brush holder 104.

SUMMARY OF THE INVENTION

Therefore, this invention is made in order to solve the aforementioned problem of the prior art, it is an object to provide a brush holder which is possible to solve the objectable noise and vibration and possible to maintain the motor high in quality.

The construction of the brush holder according to this invention for accomplishing the above-mentioned object comprises a brush holder having a holder part for suppporting a brush and contacting the brush with a commutator, characterized in that said holding part is provided with a contact part for contacting with said brush and three resilient pieces protruding toward the brush from three sides and pressing the brush in a state in which said brush is in contact with said contact part.

In the brush holder according to this invention, the brush is supported securely by the brush holder so as not to move in the holding part because the brush is pressed from three sides by the resilient pieces of the holding part in the state in which the brush is in contact with the contact part of the holding part.

DESCRIPTION OF THE PREFERRED EMBODIMENT

An embodiment of the brush holder according to this invention will be described below on basis of FIG. 1 and FIG. 2.

Figure 2:
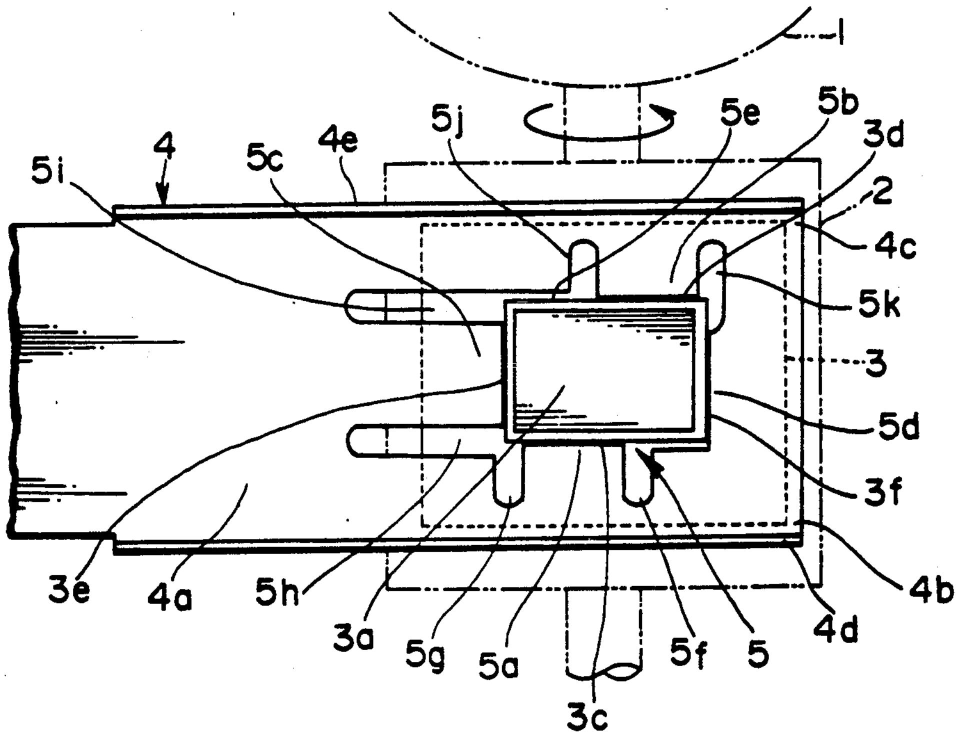
FIG. 2 is a front view of the brush holder shown in FIG. 1.
Figure 3:
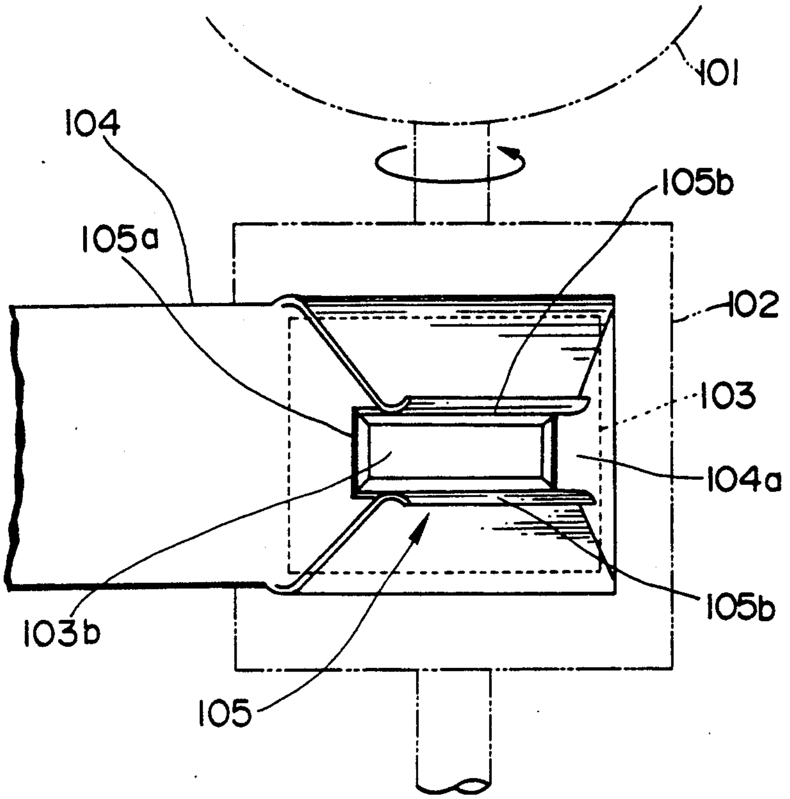
FIG. 3 (PRIOR ART)
FIG. 3 is a front view illustrating the neighbarhood of the brush in the conventional brush holder.
Figure 4:
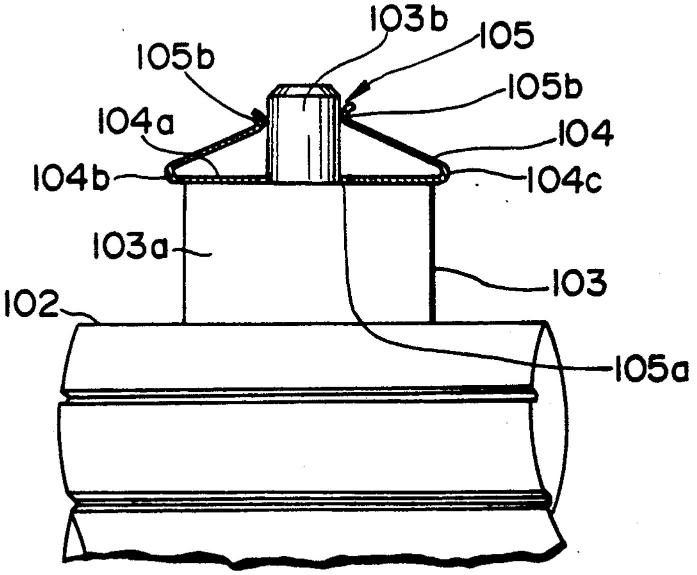
FIG. 4 (PRIOR ART)
FIG. 4 is a partially sectional side view of the brush holder shown in FIG. 3.

In the figures, a brush holder 4 made of thin metallic plate holds a brush 3 in a holding part 5 as to contact the brush 3 with a commutator 2 of an armature 1 as shown in FIG. 2, the holding part 5 is provided with a contact part 5*d* in contact with the brush 3 and resilient pieces 5*a*, 5*b* and 5*c* protruding toward the brush 3 from three sides and pressing the brush 3 at a state in which the brush 3 is in contact with the contact part 5*d*.

The brush holder 4 is formed with the holding part 5 at the right end of a plane part 4*a* thereof in FIG. 2, that is on the side of the commutator 2, and so designed as to be fixed to a holder base (not shown) at the base end on the left side of the plane part 4*a* in FIG. 2. And the brush holder 4 is provided with side walls 4*d* and 4*e* bending upwardly in FIG. 1 from both side edges 4*b* and 4*c* of the plane part 4*a* on the side of the holding part 5, in the longitudinal direction thereof.

On the one side, the holding part 5 of the brush holder 4 is provided with a rectangular-shaped or tetragonal opening 5*e* to be inserted with a projection 3*a* of the brush 3, and the resilient pieces 5*a* and 5*b* among the respective resilient pieces 5*a*, 5*b* and 5*c* protrude as far as inner part of the opening 5*e* from the both side edges 4*b* and 4*c* of the plane part 4*a*. And the resilient piece 5*c* among the respective resilient pieces 5*a*, 5*b* and 5*c* protrudes as far as inner part of the opening 5*e* from the side of the base end (from the left side in FIG. 2).

And the holding part 5 of the brush holder 4 is provided with cutouts 5*f*, 5*g*, 5*h*, 5*i*, 5*j* and 5*k* cut out in the longitudinal direction of the respective resilient pieces 5*a*, 5*b* and 5*c* on the both sides of the resilient pieces 5*a*, 5*b* and 5*c*. And the contact part 5*d* is provided at the position opposed to the resilient piece 5*c* of the holding part 5.

Namely, respective resilient pieces 5*a*, 5*b* and 5*c* protrude toward the inner part of the opening 5*e* from the three sides of said opening 5*e*, and the contact part 5*d* is provided on the other side of said opening 5*e*.

Figure 1:
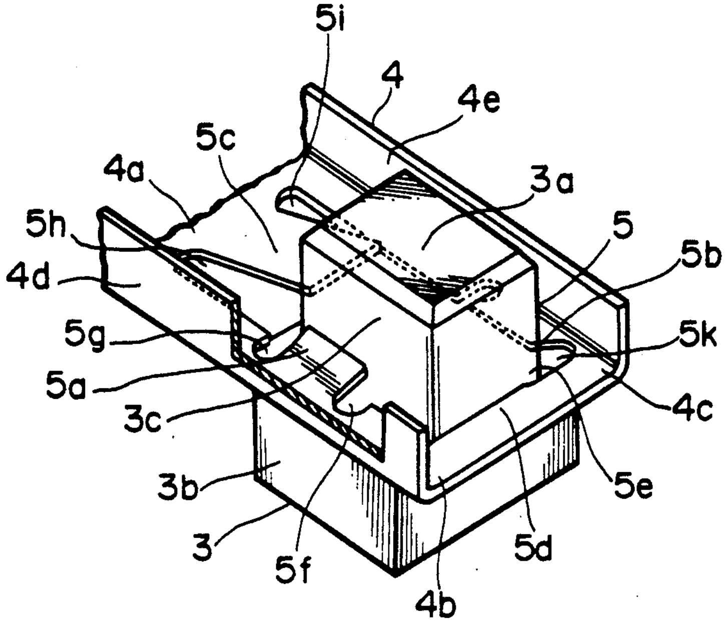
FIG. 1 is a prespective outside view illustrating the neighborhood of the brush in an embodiment of the brush holder according to this invention.

A projection 3*a* of the brush 3 is inserted into the opening 5*e* of the holding part 5 from the lower side in FIG. 1, and a contacting part 3*b* of the brush 3 is contacted with the plane part 4*a* of the brush holder 4. And the both resilient pieces 5*a* and 5*b* among the respective resilient pieces 5*a*, 5*b* and 5*c* press the side walls 3*c* and 3*d* of the projection 3*a* of the brush 3 by elasticity thereof. Accordingly, the brush 3 is supported between the resilient pieces 5*a* and 5*b* in sanwiched state from upper and lower sides in FIG. 2. And the resilient piece 5*c* among the respective resilient pieces 5*a*, 5*b* and 5*c* presses a side wall 3*e* of the projection 3*a* of the brush 3 by the elasicity thereof, and contact the opposite side wall 3*f* of the projection 3*a* with the contact part 5*d* of the holding part 5, therefore, the brush 3 is supported between the resilient piece 5*c* and the contact part 5*d* in sandwiched state from left and right sides in FIG. 2.

In this state, supplying an electric current to the armature 1 through the commutator 2 from a wire connected to the brush 3 or brush holder 4, the armature 1 rotates in the direction of the arrow shown in FIG. 2, for example.

In this time, the brush 3 is applied with a force toward the contact part 5*d* from the resilient piece 5*c* in FIG. 2, that is in the rightward direction from the left side in the figure according to the rotation of the commutator 2, but the brush 3 never moves in the opening 5*e* because the brush 3 is supported by the brush holder 4 in the state in which the projection 3*a* of the brush 3 is sandwiched between the respective resilient pieces 5*a* and 5*b* from upper and lower sides in the figure and between the resilient piece 5*c* and the contact part 5*d* from left and right sides in the figure.

And the holding part 5 is so designed as not to transmit a shock to the brush holder 4 from the respective resilient pieces 5*a*, 5*b* and 5*c* even if the brush 3 receives the shock from the commutator 2 by the cutouts 5*f*, 5*g*,

5*h*, 5*i*, 5*j* and 5*k* provided on the both sides of the respective resilient pieces 5*a*, 5*b* and 5*c*, and so designed also that the brush 3 is not disconnect from the holding part 5 so easily.

As described above, the brush holder according to this invention has a holding part for supporting a brush and contacting the brush with a commutator, and said holding part is privided with a contact part for contacting with the brush and three resilient pieces protruding toward the brush from three sides and pressing the brush in a state in which said brush is in contact with said contact part. Therefore, it is possible to hold the brush securely in the holding part, the brush never moves against the brush holder, and it is possible to solve the objectable noise and vibration during the operation, thereby an excellent effect is obtained since the motor is maintained in high guality.

What is claimed is:

1. A brush holder for supporting a brush to be in contact with a commutator, the brush having an brush body and an engaging projection which includes four side walls, said brush holder comprising:

a thin metallic plate for supporting the brush, said thin metallic plate having a tetragonal opening for receiving the engaging projection of the brush, a contact portion disposed on one side of said tetragonal opening so as to be in contact with one of the four side walls of said engaging projection of the brush, and three resilient pieces protruding from the other sides of said tetragonal opening and disposed so as to press against other three side walls of the engaging projection of the brush.

2. The brush holder as set forth in claim 1, wherein said thin metallic plate further includes cutouts on both sides of each of said resilient pieces.

* * * * *